United States Patent
Hoshina et al.

[11] Patent Number: 5,828,821
[45] Date of Patent: Oct. 27, 1998

[54] CHECKPOINT RESTART METHOD AND APPARATUS UTILIZING MULTIPLE LOG MEMORIES

[75] Inventors: Satoshi Hoshina; Hiroshi Sakai, both of Tokyo; Hideaki Hirayama, Kanagawa-ken; Shigefumi Ohmori; Takahiro Fujii, both of Tokyo; Yoshio Masubuchi, Kanagawa-ken, all of Japan

[73] Assignee: Kabushiki Kaisha Toshiba, Kawasaki, Japan

[21] Appl. No.: 665,542

[22] Filed: Jun. 18, 1996

[30] Foreign Application Priority Data

Jun. 19, 1995 [JP] Japan .................................. 7-151735
Dec. 27, 1995 [JP] Japan .................................. 7-341839

[51] Int. Cl.⁶ .................................................. G06F 11/34
[52] U.S. Cl. ..................... 395/182.13; 711/3; 711/142; 711/143; 711/147; 395/181; 395/182.11; 395/182.14; 395/182.15
[58] Field of Search ................................ 395/181, 182.11, 395/182.13, 182.14, 182.15, 182.17, 182.18; 711/3, 142, 143, 147, 148, 157; 707/202, 204

[56] References Cited

U.S. PATENT DOCUMENTS

| | | |
|---|---|---|
| 4,878,167 | 10/1989 | Kapulka et al. .................. 395/182.14 |
| 5,008,786 | 4/1991 | Thatte ................................ 711/162 |
| 5,043,866 | 8/1991 | Myre, Jr. et al. ................... 707/202 |
| 5,418,916 | 5/1995 | Hall et al. ........................... 395/569 |
| 5,455,947 | 10/1995 | Suzuki et al. ...................... 707/202 |
| 5,481,694 | 1/1996 | Chao et al. ......................... 711/112 |
| 5,544,359 | 8/1996 | Tada et al. .......................... 707/202 |

FOREIGN PATENT DOCUMENTS 2-50237   2/1990   Japan .
6-337810  12/1994  Japan .

OTHER PUBLICATIONS

Intel Corporation, "Mobile PC/PCI DMA Arbitration and Protrocols MHPG Architecture Functional Architecture Specification," Rev. 2.2, Apr. 22, 1996, pp. 2–27.

Primary Examiner—Eddie P. Chan
Assistant Examiner—Than V. Nguyen
Attorney, Agent, or Firm—Finnegan, Henderson, Farabow, Garrett & Dunner, L.L.P.

[57] ABSTRACT

Log memories for recording updated history of a main memory are provided. CPUs record the updated history of the main memory to either of the log memories and writes context thereof and content of a cache memory to the main memory at a checkpoint acquisition. The updated history of the main memory is switched from one of CPUs that has finished a checkpoint processing to other one of the log memories in which the CPUs do not use to record the updated history of the main memory. Normal processing is restarted without waiting for finishing the checkpoint acquisition of the other ones of CPUs.

21 Claims, 15 Drawing Sheets

CHECKPOINT RESTART METHOD AND APPARATUS UTILIZING MULTIPLE LOG MEMORIES

FIELD OF THE INVENTION

This invention relates to a multiprocessor system with a shared memory and especially to a multiprocessor system adopting a checkpoint restart method by using a log memory.

BACKGROUND OF THE INVENTION

The checkpoint restart method is a system recovery technology known for use in fault tolerant computer systems. In the checkpoint restart method, information necessary for reexecution of a process is periodically recorded in a log memory. A time point for recording the information is called a checkpoint and recording the information into the log memory is called acquisition of checkpoint. When execution of a program is interrupted by occurrence of a fault in a computer system, the state of the interrupted process is rolled back to a checkpoint before the occurrence of the fault, and the program is reexecuted from the checkpoint.

Information recorded by checkpoint processing includes inner states or context of processors (for example, data from registers), contents of cache memories, and a main memory. Recently, a log memory has been added to the checkpoint processing to shorten time required for such processing by storing the time when normal program execution is interrupted. Using this method, for example, image data before updating during a period from a certain checkpoint to a next checkpoint are recorded in a log memory as updated history information, every time a main memory is updated by execution of a process. When fault occurs in a computer system, a main memory is recovered to a state at a point of the checkpoint before the occurrence of that fault by using the content of the log memory. Therefore, in the checkpoint restart method with a log memory, checkpoint processing records only the contents of processors and cache memories. Time required for the checkpoint processing is therefore comparatively shortened. A typical example of a computer system adopting the checkpoint restart method with a log memory is shown in FIG. 1.

The system includes a processor module 100, a bus 400, a bus controller 500, a log memory 600 and a main memory 700. The processor module 100 includes a CPU (Central Processing Unit) 105 and a cache memory 110.

When CPU 105 updates data in the main memory 700, the bus controller 500 records the updated history in the log memory 600. When a remaining store size of the log memory 600 is below a certain size, CPU 105 starts a checkpoint processing and stores the contexts of CPU 105 and the contents of the cache memory 110 in the main memory 700. When the point acquisition processing has been finished, the updated history information recorded in the log memory 600 becomes unnecessary. After initializing the log memory 600 and discarding the updated history information, a normal processing is restarted by CPU 105. The updated history of the main memory 700 during a time from when the normal processing is restarted to the next checkpoint is recorded in the log memory 600.

Existing multiprocessor systems, each including a plurality of processor modules with a main memory, having adopted a checkpoint restart method. Each of the processor modules in such existing systems has its own independent log memory. A checkpoint processing for a multiprocessor system of this configuration is explained in detail with reference to FIG. 2(a). The multiprocessor system of this example has three CPUs, each of CPU "0", CPU "1", and CPU "2", each of which has its own independent log memory. CPU "0", CPU "1" and CPU "2" respectively perform processing ((1) in FIG. 2(a)). Thereafter, when a remaining amount of the log memory of the CPU "0" is below a predetermined amount ((2) in FIG. 2(a)), CPU "0" detects this and starts a checkpoint processing. The checkpoint processing of CPU "0" is finished after a predetermined time ((3) in FIG. 2(a)). The normal data processing of CPU "0" is restarted. Each of CPU "1" and CPU "2" continues a normal data processing during the checkpoint processing of CPU "0". In an order of CPU "1" and CPU "2", each of the checkpoint processing is started independently ((4) and (5) in FIG. 2(a)) and is finished independently ((6) and (7) in FIG. 2(a)). In this case, each of CPU "0", CPU "1" and CPU "2" can start a checkpoint processing and restart a normal program processing independently.

In this multiprocessor system of this example, each processor can restart a normal data processing. However, this requires a significant amount of hardware for a log memory for each of the CPUs of in the multiprocessor system.

Other existing multiprocessor systems use only one log memory adapted for a plurality of processors with the main memory. In that case, even if each processor has finished a checkpoint processing, a normal processing can not be restarted until all the other processors finish the checkpoint processing. Problems associated with checkpoint processing in a multiprocessor system having this configuration will now be explained in detail with reference to FIG. 2(b).

IN multiprocessor system in which three CPUs, CPU "0", CPU "1" and CPU "2" share a main memory, these CPU "0", CPU "1" and CPU "2" respectively and independently perform processing ((1) in FIG. 2(b)). Thereafter, when a remaining amount of the log memory is below a predetermined amount ((2) in FIG. 2(b)), each of CPU "0", CPU "1" and CPU "2" detect this and start a checkpoint processing ((3) in FIG. 2(b)). Start timing of the checkpoint processing and time required for finishing it depend on detection timing, kind of processing when it is detected, and states of the cache memory. Therefore, the timings of finishing the checkpoint processing differ for each of the respective CPUs. FIG. 2(b) illustrates that the checkpoint processing is finished in an order of CPU "0", CPU "2" and CPU "1".

In this case, CPU "0" and CPU "2" can not restart a normal program processing until the checkpoint processing of CPU "1" has been finished and are in a wait state ((4) in FIG. 2(b)). That is why the updated history recorded in the log memory must be held against occurrence of a fault until a time point at which the checkpoint processing of all CPUs has been finished ((5) in FIG. 2(b)). If a CPU restarts the normal processing before the checkpoint processing of all CPUs has been finished, the content of the log memory is rewritten with updating the memory by the program execution processing. In this case, if a fault occurs, the main memory can not be recovered normally at a time point of the checkpoint operation before the occurrence of fault. Therefore, CPU "0", CPU "1" and CPU "2" restart the normal processing after the checkpoint processing of all CPUs has been finished ((6) in FIG. 2(b)).

In a multiprocessor system, each processor can not restart a normal program executing processing, even if a checkpoint processing has been finished, unless all the other processors have finished the checkpoint processing. Further, the large size of cache memories prolongs time required for a checkpoint processing for each processor.

SUMMARY OF THE INVENTION

The purpose of this invention is to provide a multiprocessor system for restarting a normal processing by each processor when each processor has finished a checkpoint processing.

Another purpose of this invention is to reduce considerably the wait time of a multiprocessor system having fault tolerant protection.

In accordance with this invention, the foregoing objects, among others, are achieved by providing a multiprocessor system comprising a plurality of processors each having a cache memory and a shared memory shared by the processors, log memories for storing an updated history of the shared memory, means for writing contexts of the processors and content of the cache memory to the shared memory at each checkpoint by each of the processors, means for recovering state of the shared memory at a time point of the checkpoint before the occurrence of a fault by using the updated history stored in the log memories at occurrence of a fault, means for restarting a processing from the time point, wherein the log memories includes a first and a second log memory for storing a history information indicating the updated history of the shared memory, a log memory selecting means for selecting one of the log memories which each the processors use, means for controlling the log memory selecting means to select a log memory from one used log memory that a processor use to the other log memory that a processor does not use, when a checkpoint processing by each the processors is finished.

At least two log memories are provided in the multiprocessor system. The log memories are used by switching them for each of the processors. The normal processing of the system is restarted without destroying the content of the log memories by switching from one used log memory to the other log memory in an order of the processors in which the checkpoint processing has been finished. Therefore, the normal processing is restarted immediately when each processor has finished the checkpoint processing, whereby a wait time of a total of a system is considerably reduced.

Other objects, features, and advantages of this invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
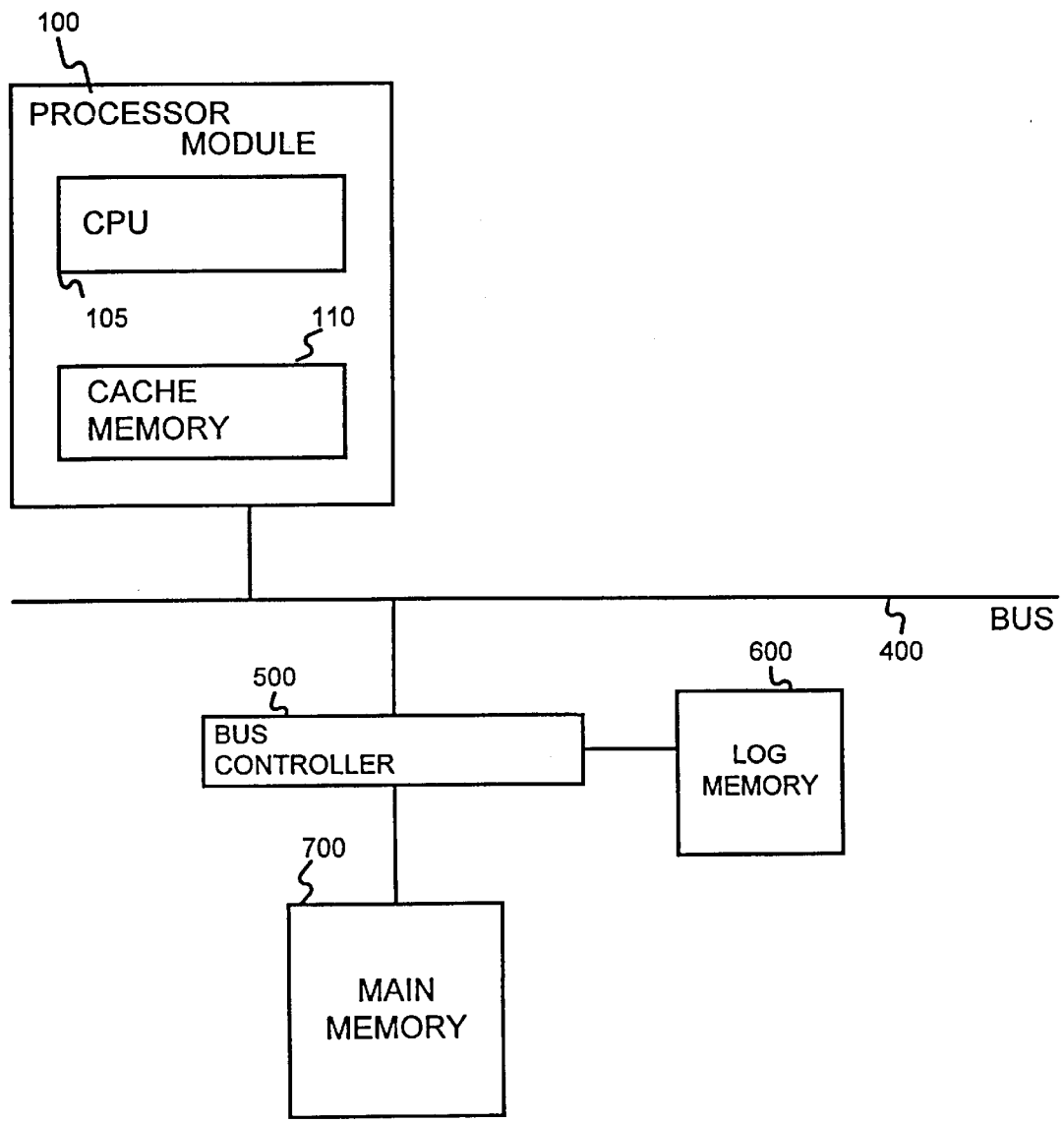
FIG. 1 is a block diagram to explain a computer system with a log memory in a prior art.
Figure 2A:
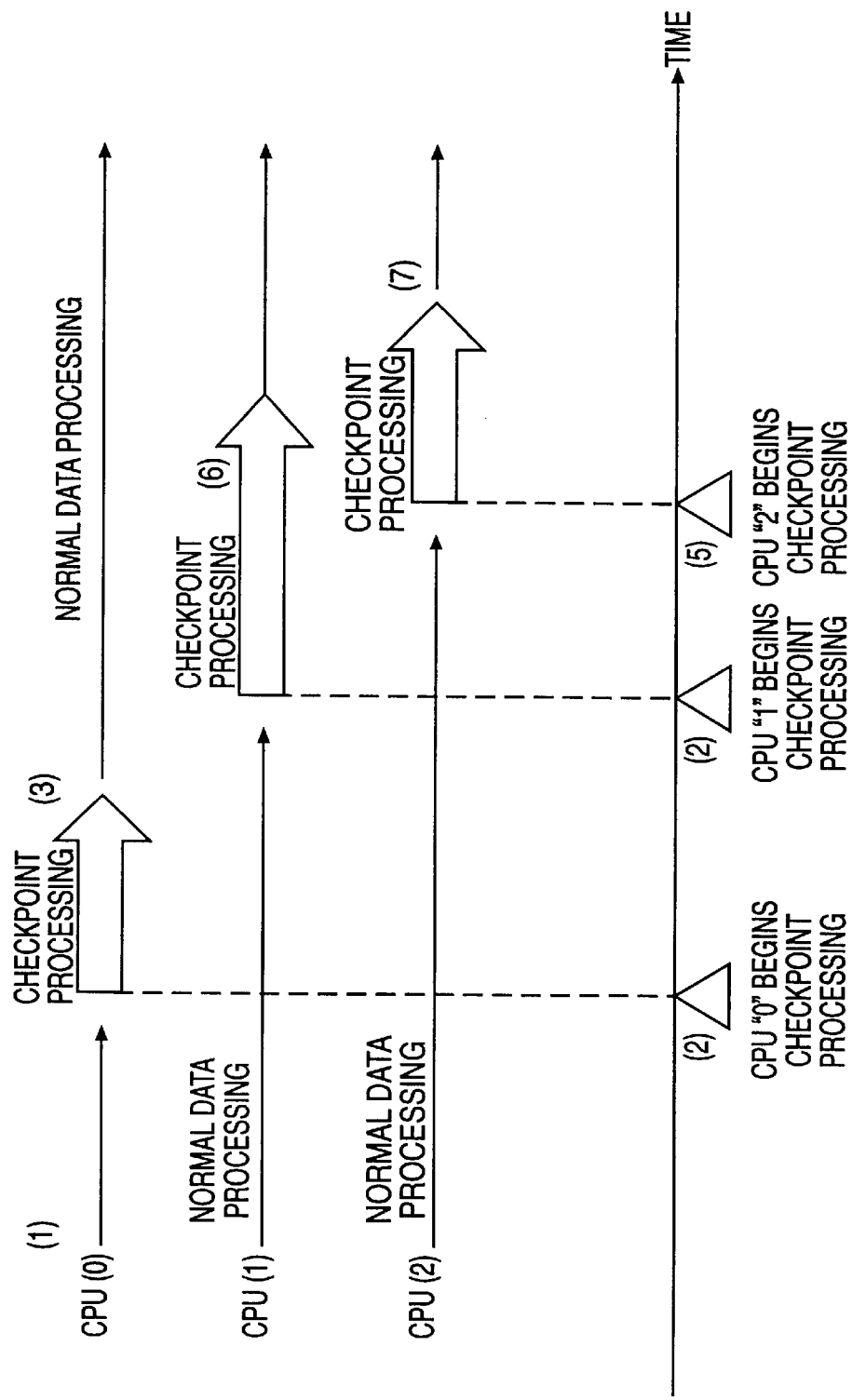
FIG. 2(a) illustrates a checkpoint processing executed by the multiprocessor computer system in which each of CPUs has an independent log memory.
Figure 2B:
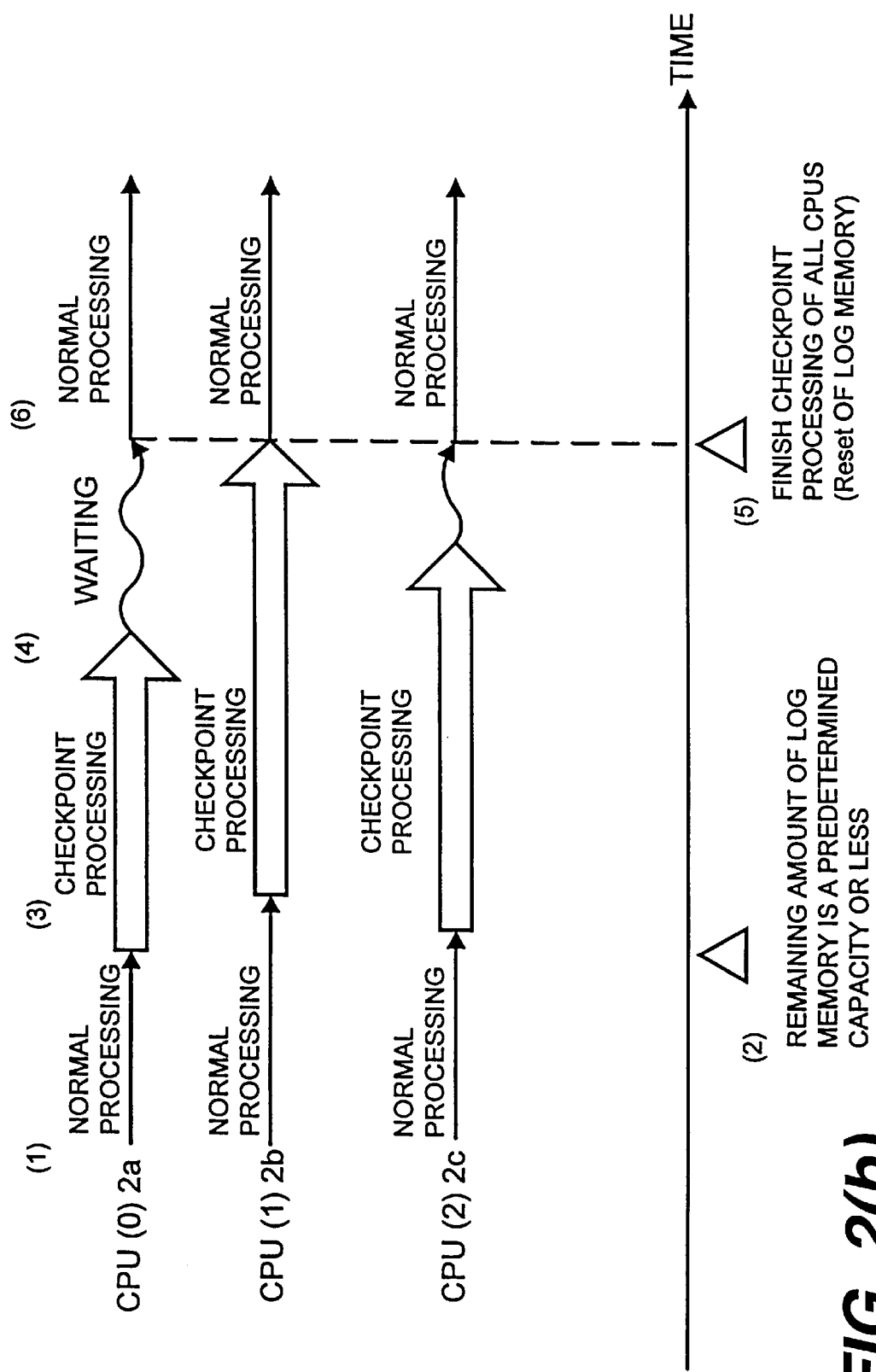
FIG. 2(b) illustrates a checkpoint processing executed by the computer system with only one log memory.
Figure 3:
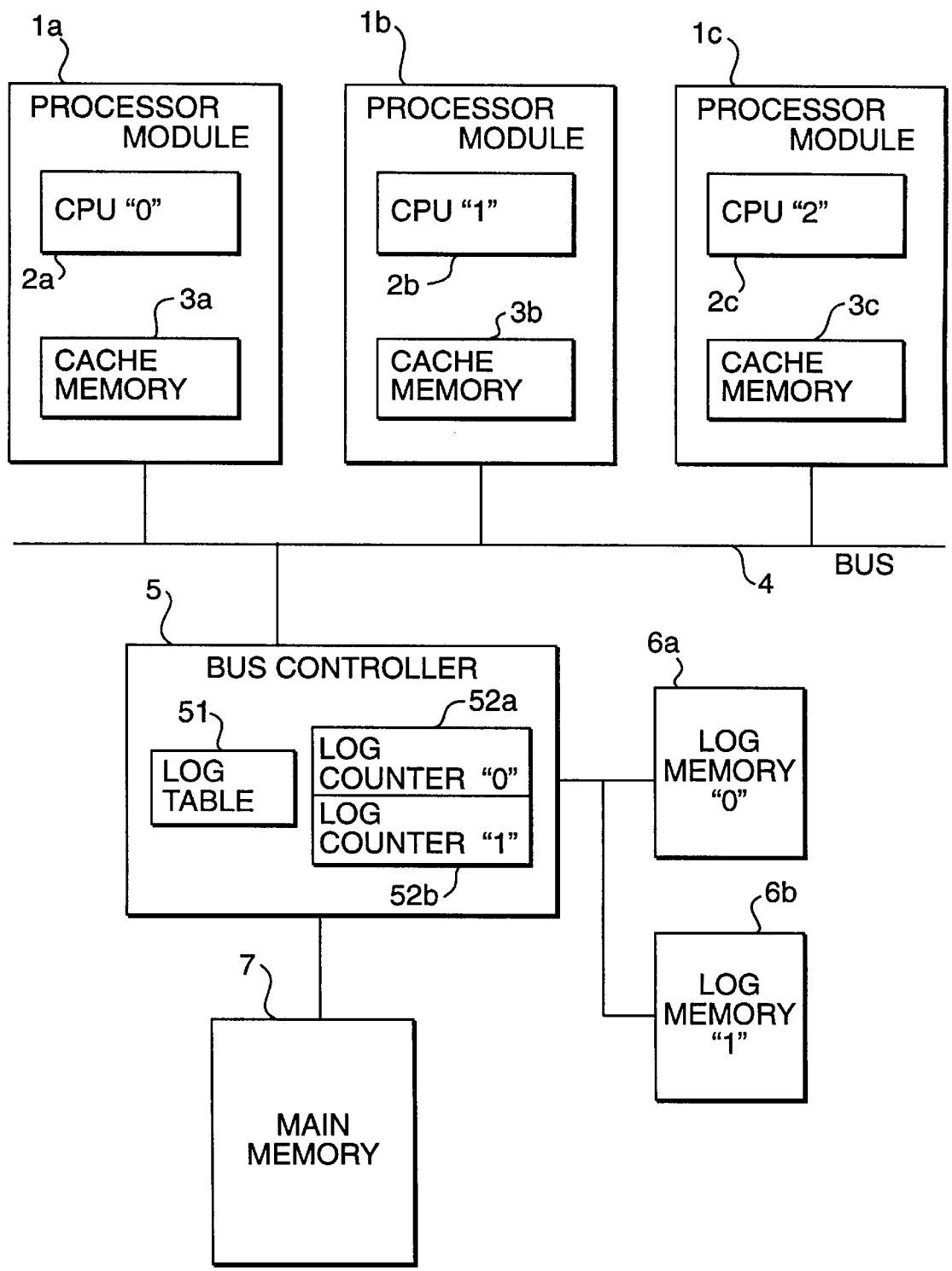
FIG. 3 is a block diagram of a preferred multiprocessor system in a first embodiment of this invention.

FIG. 3 is a block diagram of a multiprocessor system in accordance with a first embodiment of this invention. As shown in FIG. 3, the multiprocessor system includes three processor modules 1a–1c to share a main memory 7. These processor modules 1a through 1c are connected to a bus 4 and respectively have CPUs 2a–2c and cache memories 3a–3c. These cache memories 3a–3c operate as primary cache memories or secondary cache memories of CPUs 2a–2c. When a CPU executes an instruction (i.e., requests to) read data from memory, each processor module inspects whether the data is stored in the respective cache memory or not. If the data is present in the cache memory, it is transferred to CPU. Otherwise, the data is read from the main memory through the bus. In this way, the data is received from a cache memory of another processor module or the main memory 7 and the data can be stored in the cache memory of the CPU that performed the read request.

A bus controller 5 controls data transfer between the processor modules and the main memory, and has a function of controlling log memories 6a and 6b for recording updated history of the main memory. The bus controller 5 has log counters 52a and 52b, respectively, corresponding to the log memories. Further, the bus controller 5 has a log table 51 used for determining which log memory each of the processor modules is used.

Figure 4:
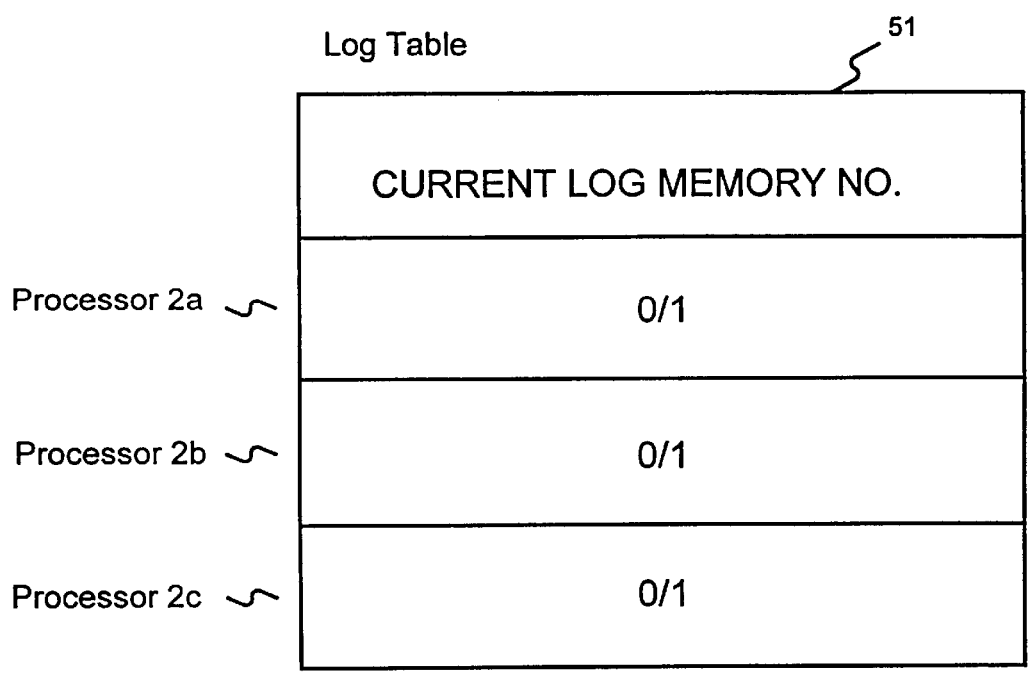
FIG. 4 illustrates the structure of a log table of the multiprocessor system in FIG. 3.

FIG. 4 shows the structure of the log table. As shown in FIG. 4, the log table stores the relationship between respective CPU numbers of the processor modules and numbers of log memories (current memory number) which CPUs currently use. In other words, each entry in the log table 51 corresponds to one of the log memories and indicates the processor currently selected to store log data including a context of the processor and content of the processor's cache in that corresponding log memory. A current log memory number "0" in the table indicates that log memory 6a is used, and a current log memory number "1" indicates that log memory 6b is used. When starting up the system, the current log memory numbers in all of CPUs indicate "0" and all of CPUs are set to use log memory 6a.

Figure 5:
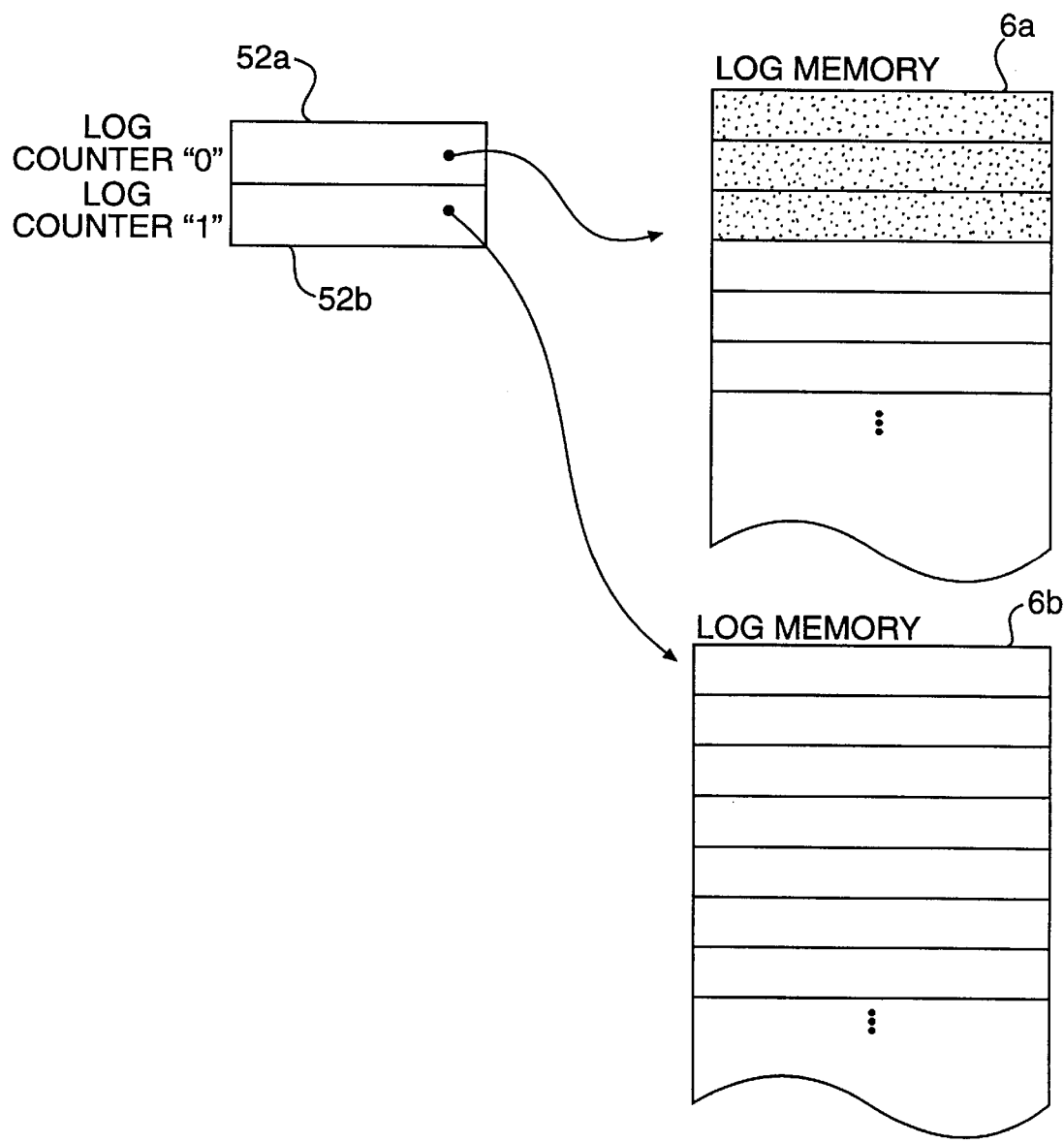
FIG. 5 is a diagram showing the relationship between two log memories and two log counters provided in the multiprocessor system of FIG. 3.

FIG. 5 shows a relationship between log counters 52a and 52b and log memories 6a and 6b. The log counter 52a holds a pointer indicating an updated history information to store a position of log memory 6a. The pointer value is incremented by +1 from an initial address to a last address of the log memory 6a, every time the updated history information is written to the log memory 6a. Log counter 52b also holds a pointer indicating an updated history information to store position of the log memory 6b. The pointer value is incremented from an initial address to a last address of the log memory 6b, every time the updated history information is written to the log memory 6b.

In a period of normal processing, each CPU 2a–2c transfers the following to the bus controller when write processing to the main memory 7 is necessary:

(1) ID (Identification) of CPU (2) Address of memory (3) Data of memory

Upon detecting a write request, the bus controllers determines which log memory 6a or 6b is used from the ID of the CPU. Here, the log memory 6a is used. After the bus controller 5 gets a value of the counter 52a corresponding to the log memory 6a, the bus controller records a memory address and data before updating of the memory address as updated history information at a location of the log memory 6a corresponding to the counter and the main memory 7 is updated.

Thereafter, when each CPU 2a–2c in the processor modules 1a–1c detects that a predetermined time has elapsed, or that a remaining size of the log memory 6a is below a predetermined amount by interruption signals from the bus controller 5 or polling processing, a checkpoint processing is started. In the checkpoint processing, values of a register necessary for recovering contexts of each CPU 2a–2c and data from in the cache memory not reflected in the main memory 7 are written to the main memory 7 through the bus controller 5. Also the updated history in this case is recorded to the log memory 6a as mentioned above.

Each CPU 2a–2c in the processor modules 1a–1c that finished processing at a given point changes the current log memory number of the log table 51 from "0" to "1" for switching the log memory 6a, 6b for use. Here, the log memory 6b is next used. Thereafter, each CPU 2a–2c restarts immediately the normal program processing.

In this way, by switching from the log memory 6a that has been used to the other log memory 6b in an order of CPUs 2a–2c that have finished a checkpoint processing, a normal processing is restarted without destroying content of a log memory. Therefore, the normal processing is restarted immediately when each CPU 2a–2c finished the checkpoint processing and the wait time of a total of the system is considerably reduced.

Operation of checkpoint processing in the system of FIG. 3 will now be explained with reference to FIG. 6.

Figure 6:
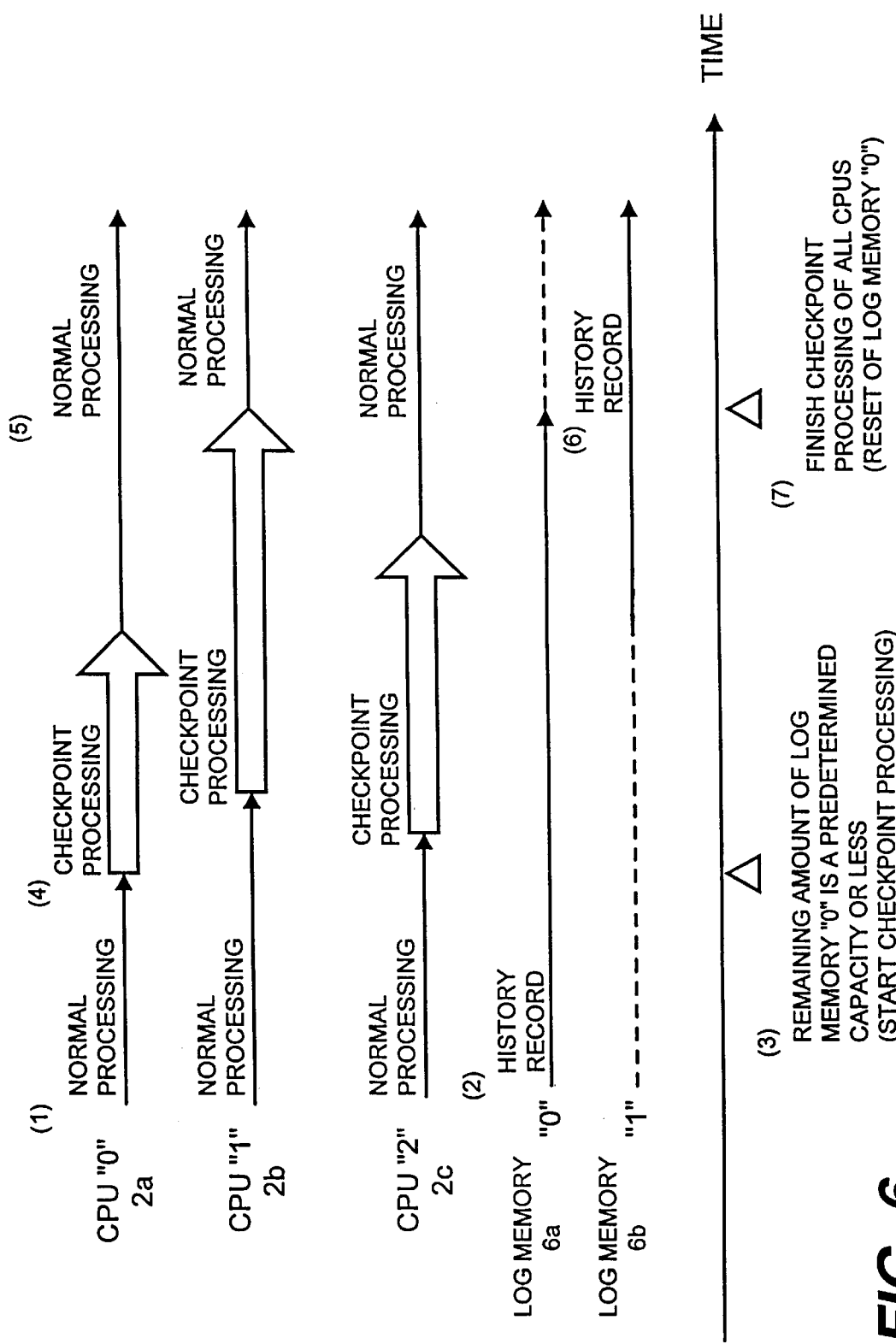
FIG. 6 is a diagram to explain a total flow of checkpoint processing executed by the multiprocessor system of FIG. 3.

As shown in FIG. 6, CPUs 2a–2c in processor modules 1a–1c are assumed to be executing a process in parallel. Each of CPUs 2a–2c is executing a normal processing ((1) in FIG. 6). Further, a log memory used at this time is assumed to be log memory 6a ((2) in FIG. 6). Thereafter, each of CPUs 2a–2c detects when the remaining size of log memory 6a becomes lower than a predetermined amount ((3) in FIG. 6), and starts checkpoint processing ((4) in FIG. 6).

As mentioned above, start up of the checkpoint processing and required time depend on detection timing of each of the CPUs 2a–2c, kind of program operating at the detection time, state of the cache memories 3a–3c. However, each of CPUs 2a–2c restarts immediately a normal processing by switching to the other log memory 6b, when it has finished the checkpoint processing ((5) in FIG. 6). Therefore, an updated history is recorded in log memory 6b against CPU that has restarted the normal processing ((6) in FIG. 6).

When the checkpoint processing of all of CPUs 2a–2c is finished ((7) in FIG. 6), log memory 6a is reset. The updated history recorded in the log memory 6a is abandoned.

Figure 7:
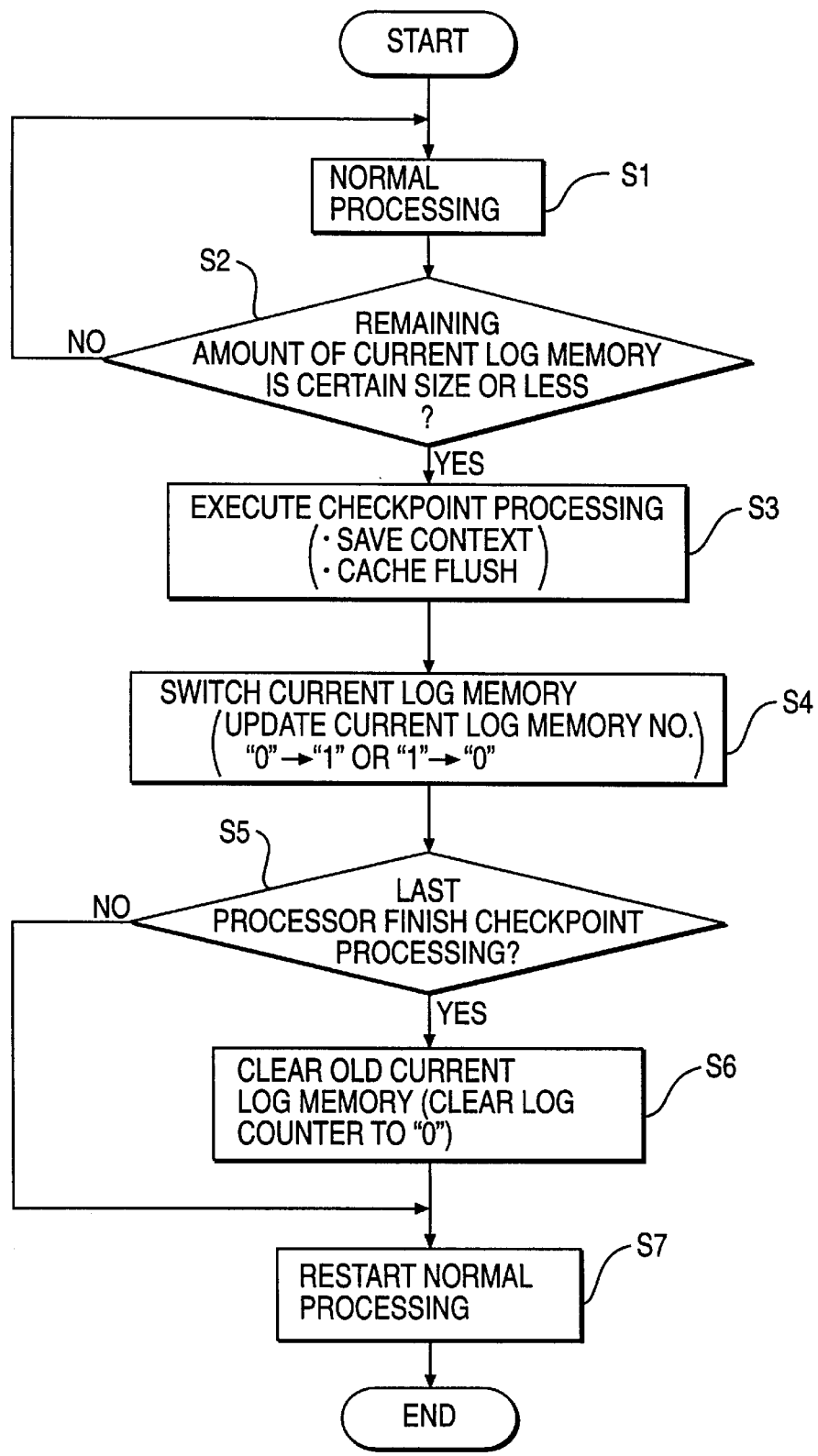
FIG. 7 is a flow chart of a procedure of checkpoint processing executed by CPUs in each processor module provided in the multiprocessor system of FIG. 3.

Next, a procedure of the checkpoint processing that each CPU executes will be explained in accordance with the flow chart of FIG. 7.

CPUs 2a–2c in processor modules 1a–1c execute the normal processing (Step S1). When the remaining size of the log memory is detected by an operating system to become below a predetermined amount (Step S2), the checkpoint processing is started by CPUs (Step S3). In the checkpoint processing, the context or state of the CPU including various registers of the CPU, and the content of the cache memory not stored to the main memory are written to the main memory. Next, CPU changes the corresponding current log memory number of the log table from "0" to "1" to switch the log memory (Step S4).

Thereafter, CPU determines whether it is the last CPU that has finished the checkpoint processing or not (Step S5). This is executed by investigating whether CPUs, which have not changed the current log memory numbers, are present or not in reference to the log table. When current log memory numbers against all of CPUs are changed to new numbers, CPU is the last CPU that has finished the checkpoint processing. In that case the last CPU clears the log memory to invalidate the content of the log memory that has been used (Step S6). In the clear processing, the pointer value of the log counter corresponding to the log memory is restored to "0". Thereafter, the last CPU restarts a normal processing that was interrupted by the checkpoint processing (Step S7).

When some fault occurs in the multiprocessor system in FIG. 3, the updated history information added to the stack of the present log memory is successively read out. The read out data before updating is written to a corresponding address in the main memory. Therefore, the main memory is recovered to the state at the time of the checkpoint before the occurrence of fault. If the pointer value of the low counter corresponding thereto is not "0" with respect to another log memory, the same processing is performed.

Therefore, the content of the main memory at the time of the checkpoint before the fault is recovered. The contexts of CPUs are recovered by using the contents of the registers in CPUs saved in the main memory. Further, Cause of the fault is clarified under this recovery stage. A normal processing is executed without causing abnormality in the system even in case of fault after removing it.

Next, a multiprocessor system according to a second embodiment of this invention will be described below.

The multiprocessor system according to the second embodiment is different from the system of the first embodiment in using a transaction controller for dynamically switching write policy (write through/write cache) of a cache memory of each processor.

A method for writing data not only to a cache memory but to a main memory at the same time is called a write through cache. In this method, the time to write to both cache and main memories is the same as access time to the main memory. Therefore, considerable high-speed achievement of a normal processing is not expected. However, it is not necessary to flush the content of a cache memory in a checkpoint processing, so the time required for the checkpoint processing is shortened.

By contrast, a method for writing data only to a cache memory is called a write back cache. When performing a cache flush operation in a computer system using this method, the content of the cache memory is rewritten to a main memory. Therefore, although the write back cache, compared with the write through cache increases the time required for the checkpoint processing, bus traffic in a normal processing is reduced and performance of a total of a computer system is promoted.

Therefore, in the multiprocessor system, according to the second embodiment the cache memories of all the processor modules are basically operated by the write back cache. In the case a real time processing that needs to finish processing in a constant time, the cache memories are switched to a write through cache regarding portions of the processor modules. The processor modules execute the real time processing. Such a switching processing of the write policy of a cache memory is performed under control of a program operating in the multiprocessor system.

Further, it dynamically changes the number of the processor modules operating by a write through cache based on throughput and a response time of the multiprocessor system by using a program for monitoring operational state of the system.

Figure 8:
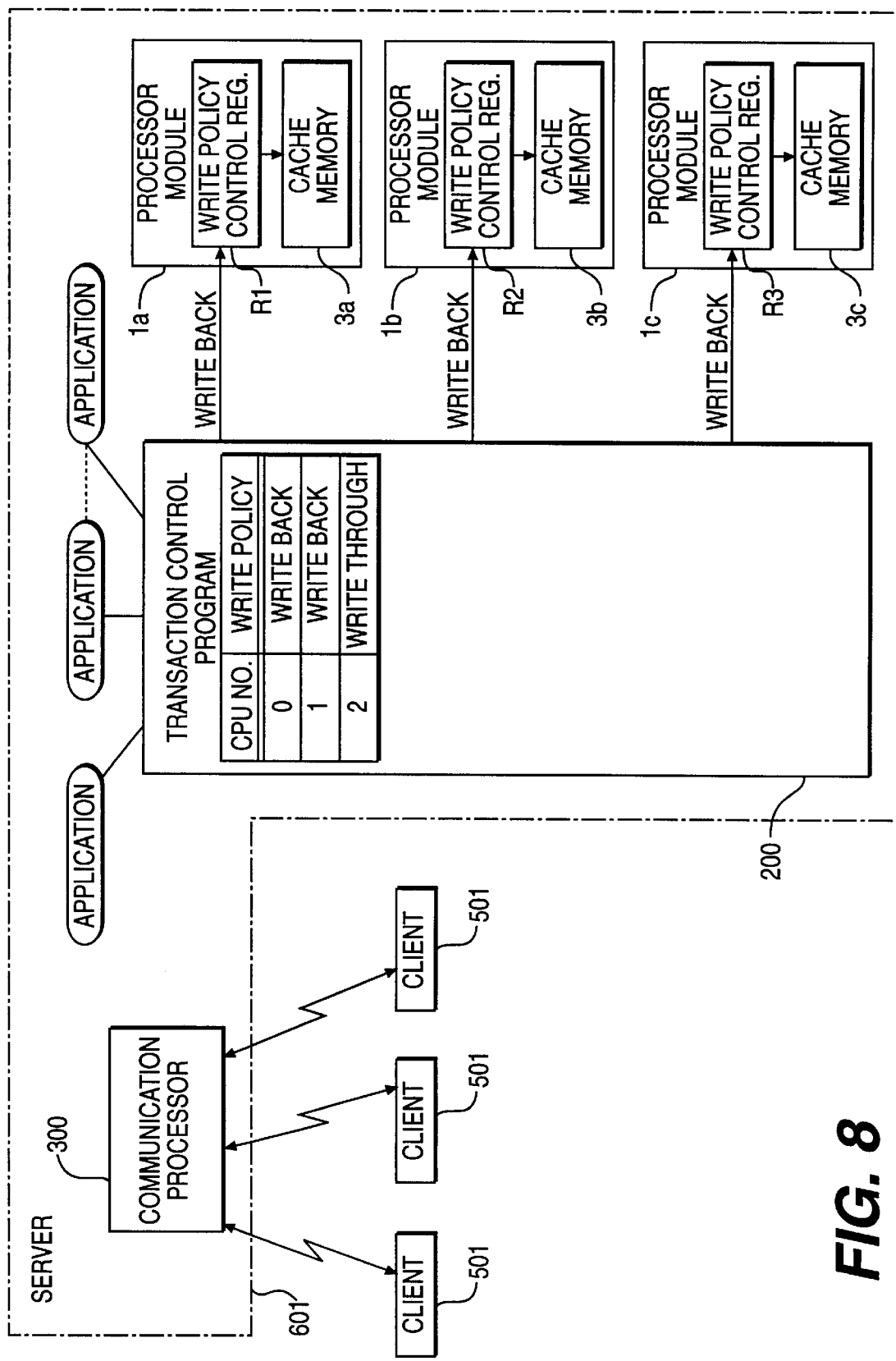
FIG. 8 is a diagram to explain principle of cache write policy control of a prodder multiprocessor system in according with a second embodiment of this invention.

FIG. 8 will now be used to describe in more detail the transaction processing system of the multiprocessor system according to the second embodiment. FIG. 8 shows a plurality of client computers 501 and a server computer 601 generally constituted by the multiprocessor system in FIG. 3 with a number of changes as noted below. In the server computer, transaction processing requests from the plurality of client computers are received by a communication processor 300. The transaction processing requests are distributed to and processed by various application programs by a transaction control program 200. Processed results are provided to the client computers 501 via the transaction control program 200 and the communication processor 300.

The transaction control program 200 monitors the operational state of the server computer 601. The transaction control program 200 has a function of dynamically changing the number of processor modules operating by a write through cache, based on throughput and response time. in the following description, the throughput means number of transaction processing requests per unit time and the response time is the response time from when a transaction processing request is received to when a processed result thereto is informed.

The principle of the write policy changing operation will now be explained. Cache memories 3a–3c are implemented as primary cache memories of CPUs 2a–2c, as shown in FIG. 8.

The write policy (write back/write through cache) of cache memories 3a–3c is determined by a value set by write policy control registers R1–R3 in the corresponding CPUs 2a–2c. Therefore, the transaction control program controls the number of CPUs, each having cache memories operating by the write through system, by changing values written to the write policy control registers R1–R3. In the case, the transaction control program controls which CPU is currently operating as a CPU having a write through cache memory.

Next, a flow of the checkpoint processing where write through cache memories and write back cache memories are mixed will be explained, with reference to FIG. 9. However, only operational differences from those explained with reference to FIG. 6 will be explained in detail. The cache memories provided to CPUs 2a–2b are assumed to operate by a write back cache. The cache memory provided to CPU 2c is assumed to operate by the write through cache.

Figure 9:
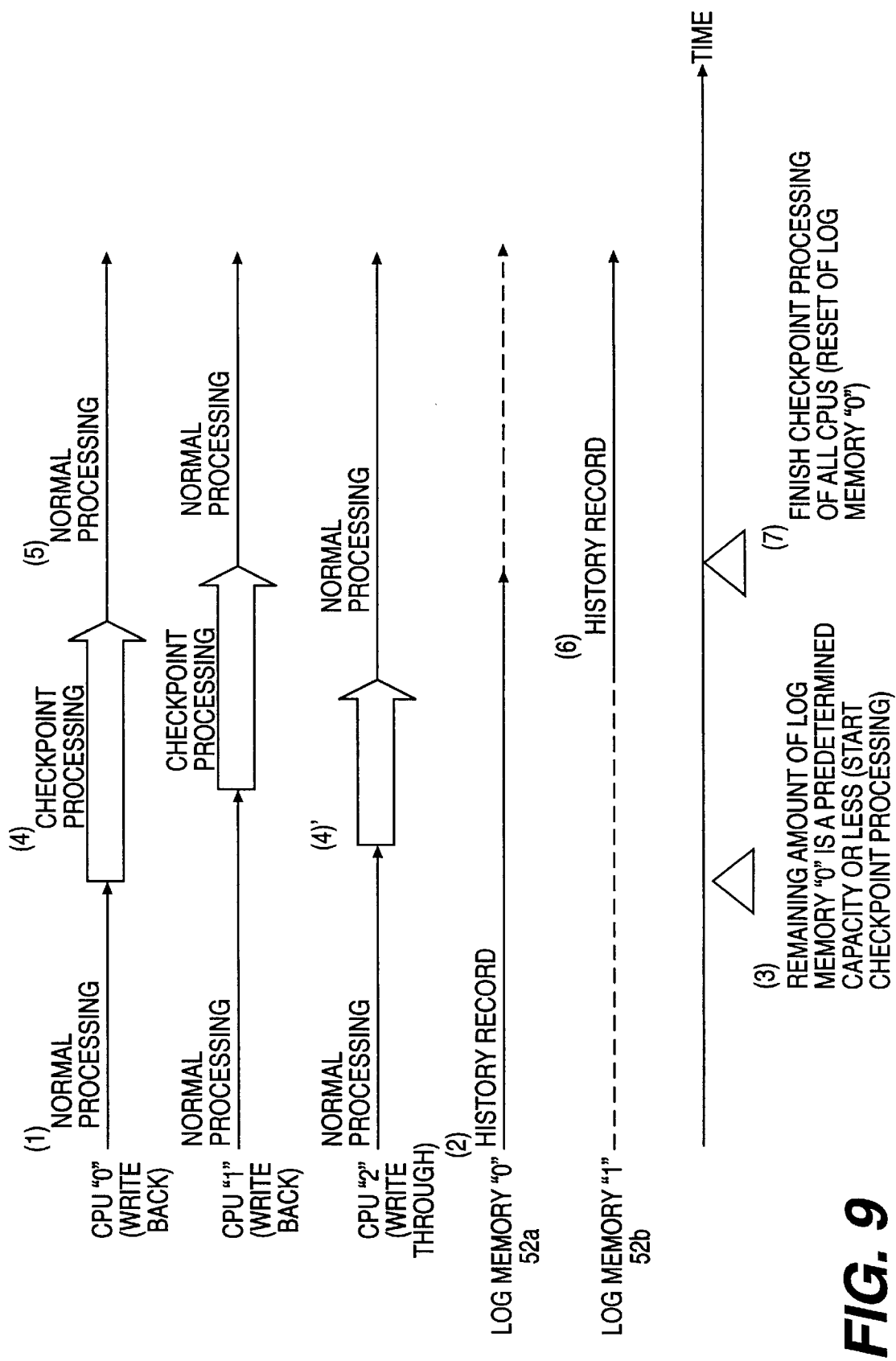
FIG. 9 is a diagram to explain a total flow of checkpoint processing where write through cache memories and write back cache memories are included in the multiprocessor system according to the second embodiment of this invention.

Time spent by a checkpoint processing ((4)' in FIG. 9) of CPU 2c is considerably shortened in comparison with a checkpoint processing of CPUs 2a–2b ((4) of FIG. 9). Therefore, when a real time processing, which always needs to finish in a predetermined time, is processed by CPU 2c, any adverse effect accompanied by the checkpoint processing is avoided. This is because a CPU having a write through cache memory eliminates the need to copy the content of the cache memory to the log memory; only the context of the CPU (with the write through cache memory) needs to be stored in the log memory during checkpoint processing.

Figure 10:
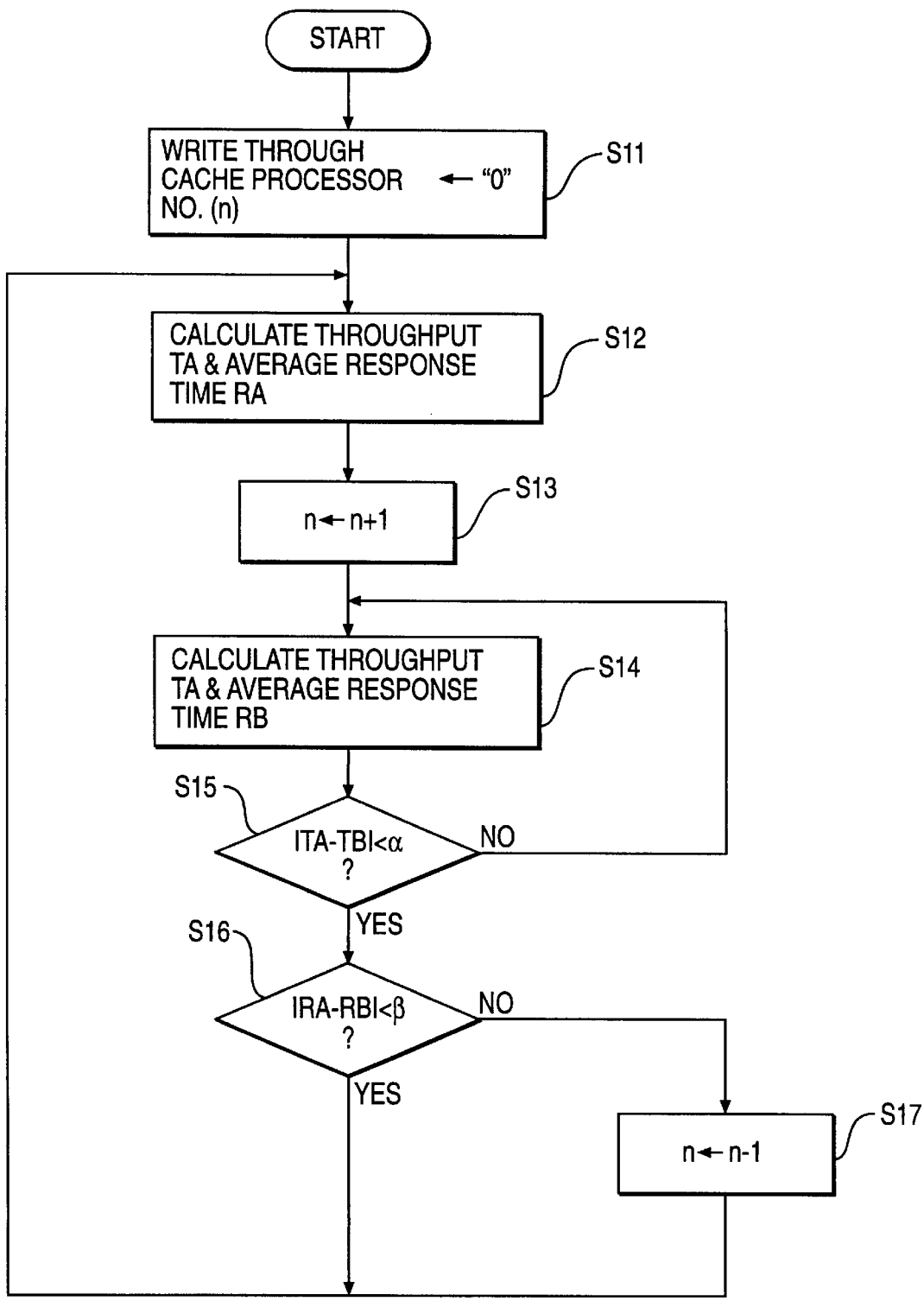
FIG. 10 is a flow chart of a processing for changing the number of CPUs, each having a write through cache memory, in the multiprocessor system according to the second embodiment of this invention.

Therefore, the adverse effect on a real time process during a long operation of checkpoint processing is nearly eliminated. The response time is improved. A procedure of processing in dynamically changing the number of CPUs executed by the transaction control program will now be explained by referring to a flow chart in FIG. 10. Each of CPUs has a write through cache memory according to the operational state of a system.

The transaction control program first substitutes a value "0" to a variable (n) showing the number of processors operating as CPUs having a write through cache memory. All of CPUs 2a–2c operate as CPUs having a write back cache memory (Step S11). Reception and response of transaction requests are started. The transaction control program calculates throughput TA and mean response time RA at certain time intervals, for example, every 5 minutes (Step S12). Further, the transaction control program increments the value of the variable by +1 and changes the write policy of the cache memory of a CPU from a write back cache to a write through cache (Step S13). The transaction control program calculates throughput TB and mean response time RB with respect to the following 5 minute times interval (Step S14).

Next, the transaction control program calculates a difference between the throughput TA and the throughput TB and determines whether the difference is smaller than a constant value α (Step S15). Thus, the transaction control program determines whether the throughput does not vary considerably between before and after changing the variable (n). If the variation of the throughput is small, the transaction control program subtracts the value of the response time RB from the response time RA. The transaction control program determines whether the response time is more reduced after changing the variable (n) than before changing it. The transaction control program determines whether the difference is larger than a constant value β or not (Step S16). If it is larger than the constant value β, the transaction control program further adds the value of the variable (n) by +1. The transaction control program increases the number of CPUs operating with a write through cache by 1.

Otherwise, If it is smaller than the constant value β, the transaction control program subtracts the value of the variable (n) by −1. The transaction control program decreases the number of CPUs operating as CPU having a write through cache memory (Step S17).

The processing of S12–S17 are repeatedly performed during the operation of the system. Therefore, the write through cache memories and the write back cache memories are mixed in certain numbers.

A multiprocessor system according to a third embodiment of this invention will now be explained. The multiprocessor system of the third embodiment is different from the first embodiment in that two of the log memories 6a–6b are implemented in a single physical memory. Additionally, controlling the single log memory requires different control software from these described above with regard to the first embodiment.

Figure 11:
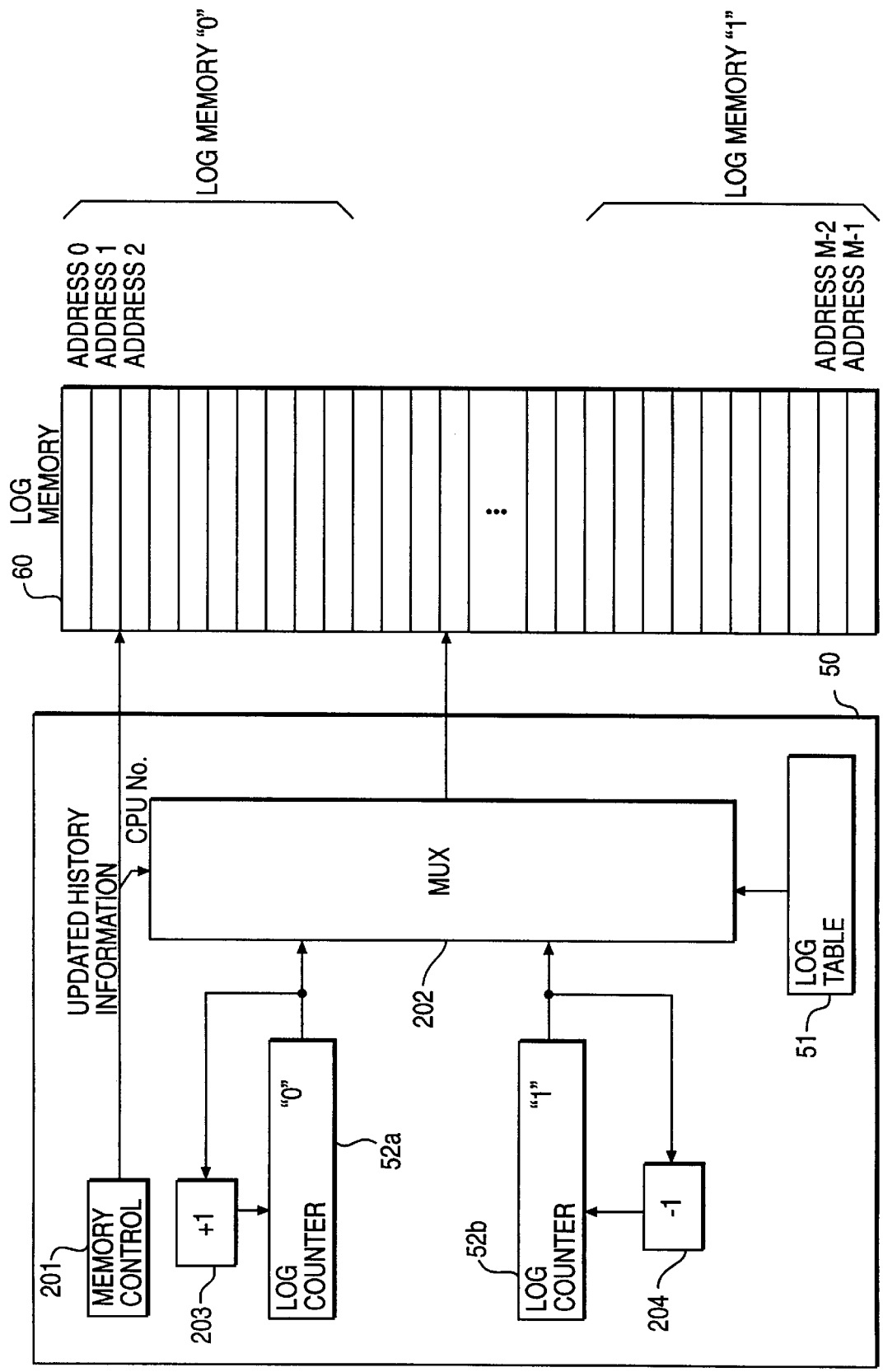
FIG. 11 is a block diagram of a multiprocessor system in accordance with a third embodiment of this invention.

The log memories 6a and 6b of FIG. 3 are implemented in a single physical memory 60 in FIG. 11. of a random access memory in which an address area is from address "0" to address "M−1". An updated history is stored at one address in the log memory. Two of log memories 6a and 6b (FIG. 3) are logically implemented in a memory space of log memory 60.

A bus controller 5 is provided with a log table 51, two of log counters 52a and 52b, a memory control logic 201, a multiplexer 202, an adder 203 and a subtracter 204.

The log counters 52a and 52b are respectively used to hold addresses in the log memory 60 to record updated history information. The pointer value held by the log counter 52a is used for the portion of log memory 60 corresponding to the log memory 6a (FIG. 3). The adder 203 successively increments the pointer value by +1 from address "0" toward "M−1" of the log memory 60, every time updated history information is recorded in the portion of log memory 60 corresponding to log memory 6a. The pointer value held by the log counter 52b is used for the portion of log memory 60 corresponding to log memory 6b (FIG. 3). The subtracter 204 successively decrements by −1 from address "M−1" toward address "0" of the log memory 6 every time updated history information is recorded in the portion of log memory 60 corresponding to the log memory 6b.

Therefore, address "0" to address "M−1" indicated by the log counter 52a corresponds to the log memory 6a. Address "M−1" to address "+1" indicated by the log counter 52b corresponds to the log memory 6b. The memory control logic 201 supplies the updated history information (address of main memory, image data before updating) to the log memory 6 as write data. The memory control logic 201 sends a CPU number (processor ID) which issued a write request to the multiplexer 202.

The multiplexer 202 obtains the current log memory number corresponding to the received CPU number from the log table 51. Further, the multiplexer 202 selects the pointer value of the log counter corresponding to the current log memory number and sends it to the log memory 6 as write address.

Figure 12:
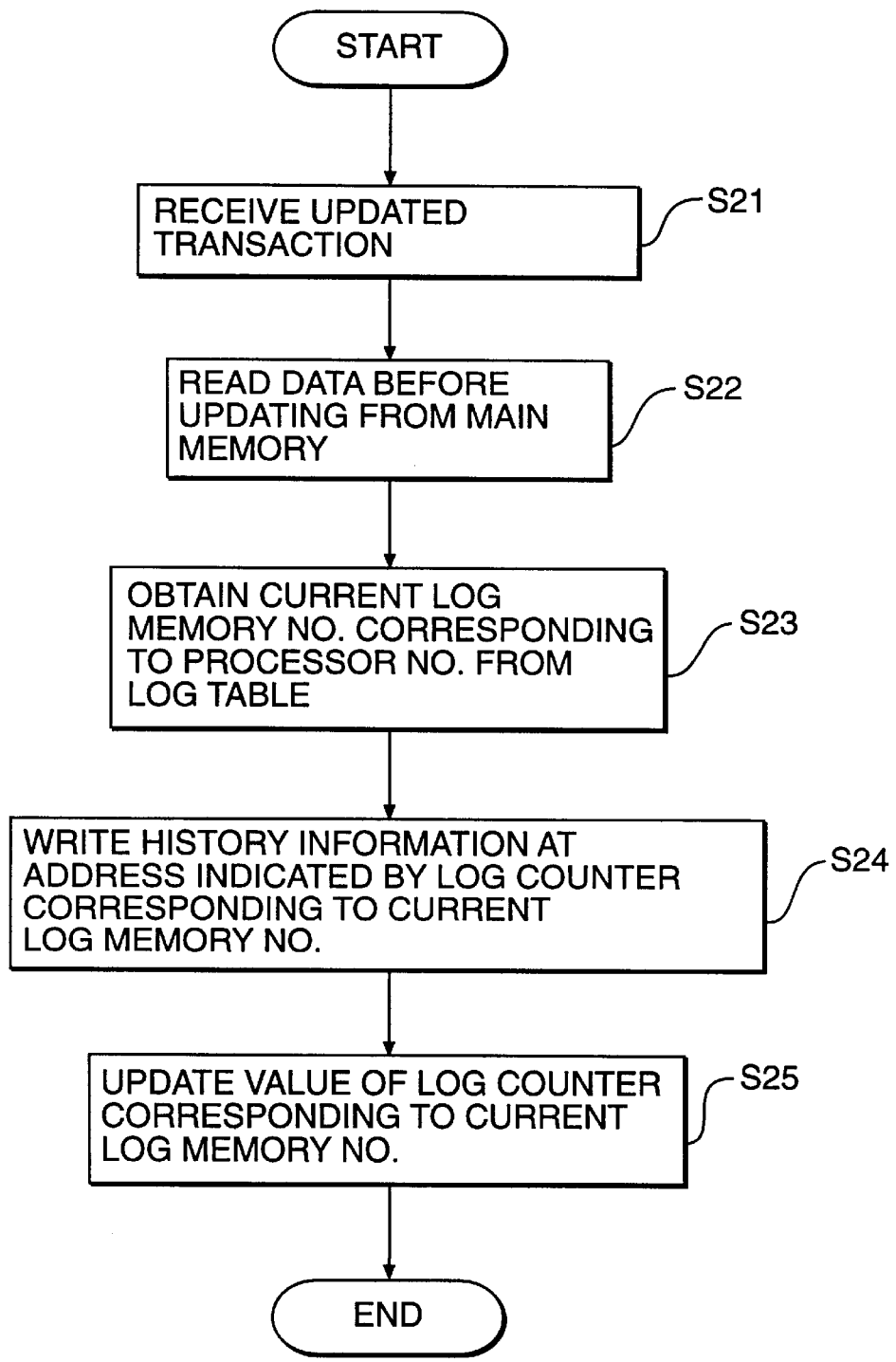
FIG. 12 is a flow chart of operation of the bus controller in FIG. 11.

The operation of the bus controller 5 in FIG. 11 is explained, referring to FIG. 12 as follows.

At the initial state, the pointer value of the log counter 52a is "0" and the pointer value of the log counter 52b is "M−1". This means that updated history information is not recorded in either portion of the log memory 60 that corresponding to the log memory 6a and the log memory 6b (FIG. 3).

When the bus controller receives a write request (updated transaction) to the main memory from either of CPUs 2a–2c (Step S21), the memory control logic reads image data before updating from the main memory and sends the image data before updating and the updated history information including a memory address of the main memory to the log memory (Step S22). Thereafter, the multiplexer reads the current log memory number corresponding to the CPU number issuing the write request from the log table (Step S23). Further, the multiplexer selects the pointer value of the log counter corresponding to the read current log memory number in the log counters 52a and 52b (Step S24). Therefore, the updated history information is recorded in an address of the log memory indicated by the pointer value of the selected log counter. Thereafter, the pointer value of the selected log counter is updated (Step S25).

For example, if the current log memory number corresponding to the CPU number indicates the portion of log memory 60 corresponding to log memory 6a (FIG. 3), the pointer value of the log counter 52a is selected. The updated history information is recorded in an address indicated by the pointer value. Further, the adder increments the pointer value read from the log counter 52a by +1 and is again stored to the log counter 52a.

Similarly, if the current log memory number corresponding to the CPU number indicates the portion of log memory 60 corresponding to log memory 6b (FIG. 3), the pointer value of the log counter 52b is selected and the updated history information is recorded in an address indicated by the pointer value. Further, the subtracter 204 subtracts the pointer value read from the log counter 52b by −1 and is again stored to the log counter 52b.

Figure 13:
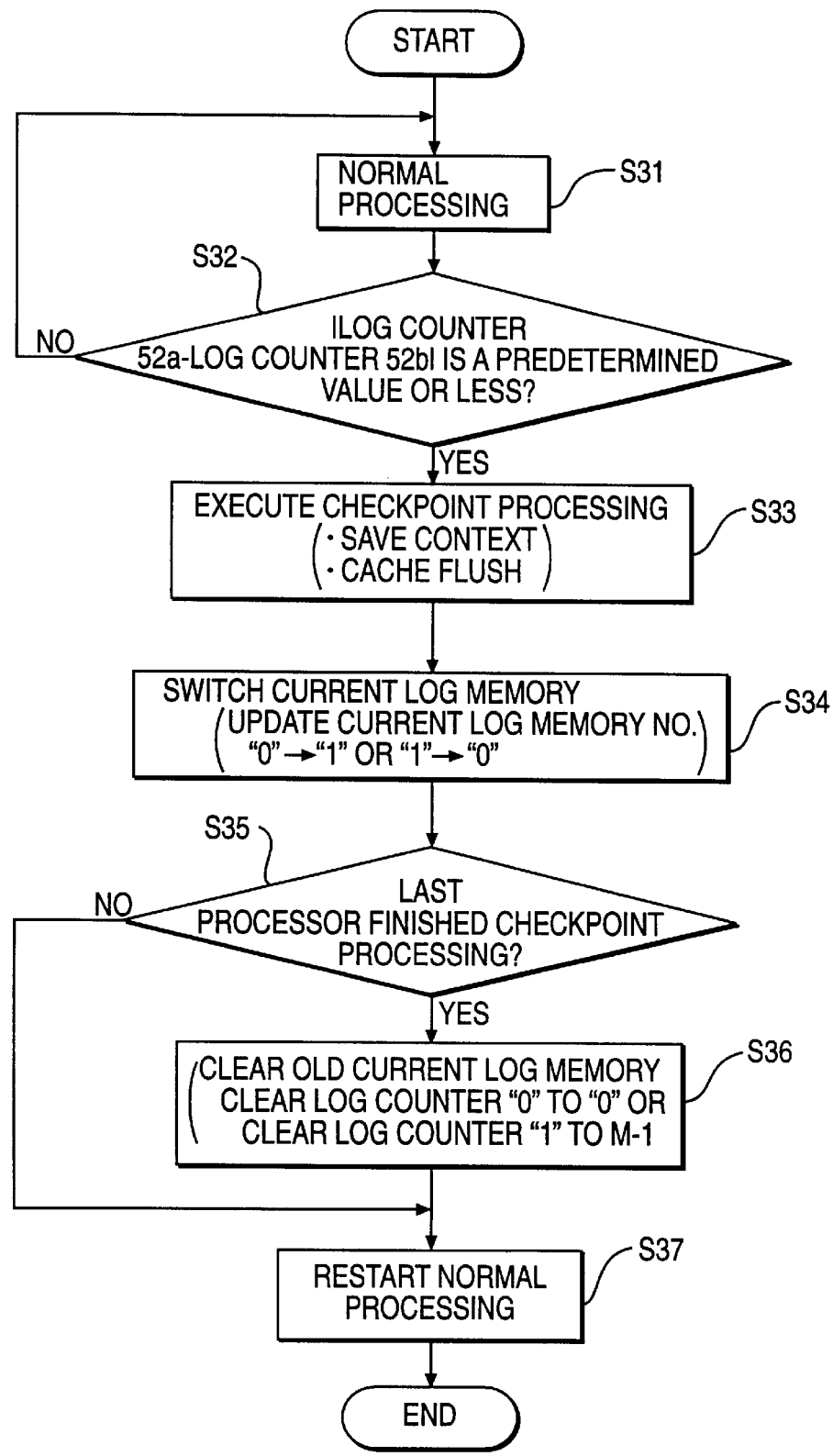
FIG. 13 is a flow chart to explain the procedure of checkpoint processing executed by CPUs of each of processor modules in the multiprocessor system of the third embodiment.

Next, the procedure of the checkpoint processing which CPUs in the processor modules perform is explained in the third embodiment, referring to a flow chart in FIG. 13.

The remaining size of the log memory 60 is detected to become below a predetermined amount by the bus controller (Step S32), while CPUs in the processor modules 1a–1c perform a normal processing (Step S31). A checkpoint processing is started by one of the CPU 2a–2c (Step S33). The remaining size of the log memory 60 is calculated as a difference between a pointer value in the log counter 52a and a pointer value in the log counter 52b by the one of the CPU 2a–2c executing the checkpoint processing. In the checkpoint processing, the context of CPU including various registers and the contents of the cache memories not stored to the main memory are stored in the main memory. In case of a write through cache memory, the contents have already been stored in the main memory. Therefore, only the context of CPU is stored in the main memory.

Next, the CPU changes the current log memory number of the log table from "0" to "1" to switch the log memory for use. Thereafter, the CPU determines whether it is the last CPU that finished the checkpoint processing or not (Step S35). For example, the CPU determines whether CPUs that do not change the current log memory numbers are present or not by referring to the log table. If the current log memory numbers of all of CPUs are changed to new numbers, the CPU is the last CPU that finished a checkpoint processing. In this case, the CPU clears the log memory to invalidate the content of the log memory that was used (Step S36). In the clear processing, the pointer value of the log counter 52a is restored to "0" if the log memory is the portion of log memory 60 corresponding to log memory 6a (FIG. 3). The pointer value of the log counter 6b is restored to "M−1" if the log memory is the portion of log memory 60 corresponding to log memory 6b (FIG. 3). Thereafter, the CPU restarts a normal processing that was interrupted by the checkpoint processing (Step S37).

When some fault occurs in the multiprocessor system, updated history information recorded in the last portion of log memory 60 (i.e., portion of log memory 60 corresponding to log memory 6a, 6b (FIG. 3)) in a stack way is successively read by the CPU. Data before updating is stored in corresponding address in the main memory by CPU. Therefore, the main memory is recovered at the time of the last checkpoint before the occurrence of fault. If the pointer value of the log counter is not an initial value regarding the other log memory, the similar processing is performed.

Figure 14:
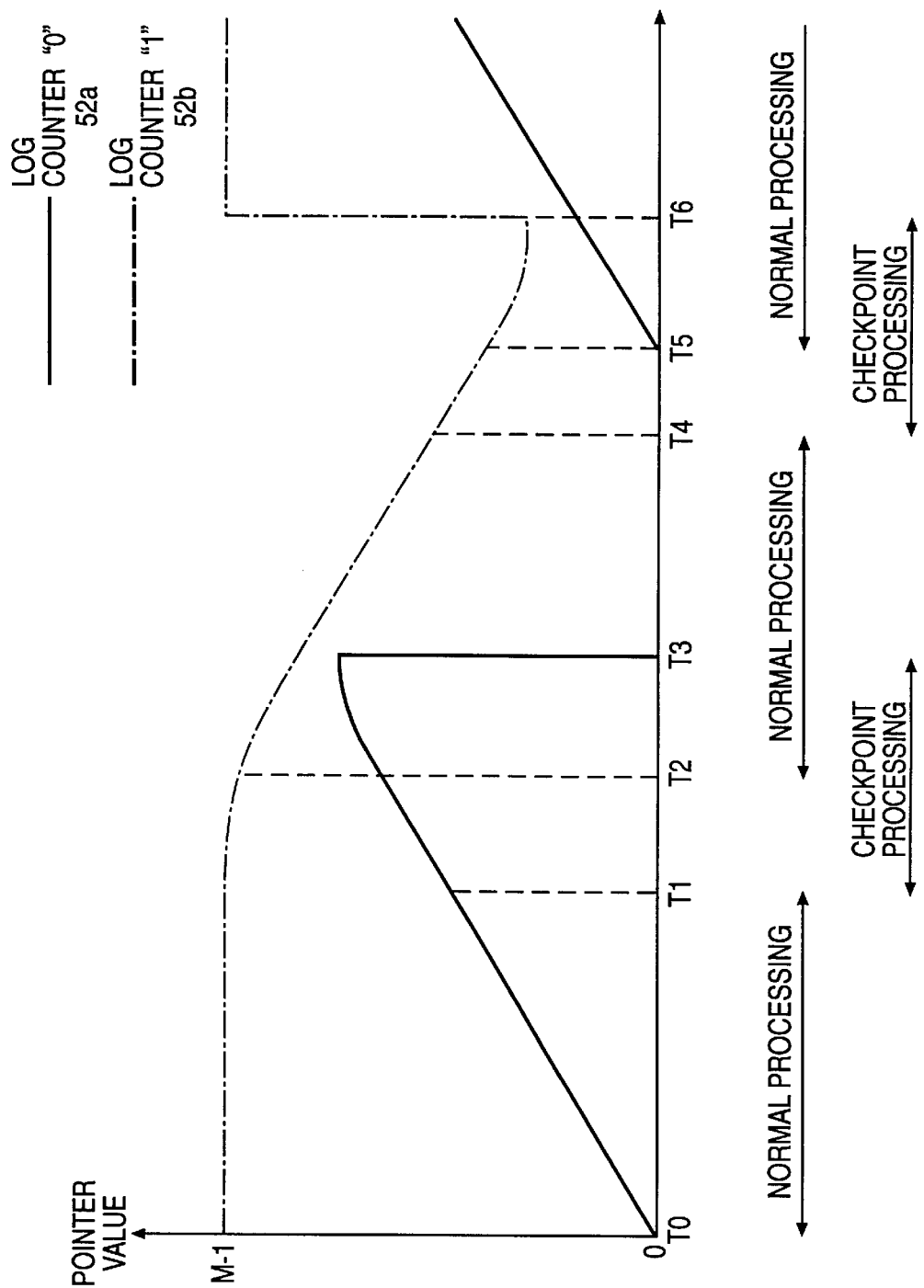
FIG. 14 is a diagram illustrating the change of pointer values of two log counters in the multiprocessor system of the third embodiment.

FIG. 14 shows behavior of the changes of the pointer values of the log counters 52a and 52b. The processor modules in the system of the third embodiment repeatedly perform a normal operation and a checkpoint processing.

TO in FIG. 14 designates an initial state where the pointer value of the log counter 52a is "0" and the pointer value of the log counter 52b is "M−1". At this time updated information is not recorded in the log memory 60. Further, the current log memory numbers of all of CPUs indicates the portion of log memory 60 corresponding to log memory 6a. A normal processing is started from this state T0.

At a point of T1, the remaining size of the portion of log memory 60 corresponding to log memory 6a, that is, difference between a pointer value held in the log counter 52b and a pointer value held in the log counter 52a is below the predetermined amount. When CPU detecting it, CPU starts successively a checkpoint processing.

At a point of T2, CPU which first finished a checkpoint processing switches from the portion of log memory 60 corresponding to log memory 6a to the portion of log memory 60 corresponding to log memory 6b and immediately returns to a normal processing. Thereafter, the portion of log memory 60 corresponding to log memory 6b is used for recording updated history information in the normal processing of the CPU.

At a point of T3, CPU that lastly finished a checkpoint processing, performs switching from the portion of log memory 60 corresponding to log memory 6a to the portion of log memory 60 corresponding to log memory 6b and the initialization of the portion of log memory 60 corresponding to log memory 6a and returns to a normal processing. Here, the initialization of the portion of log memory 60 corresponding to log memory 6a, that is, the invalidation of updated history information in the portion of log memory 60 corresponding to log memory 6a is performed by restoring the pointer value of the log counter 52a to "0". At a point of T4, the remaining size of the portion of log memory 60 corresponding to log memory 6b, that is, difference between a pointer value held in the log counter 52b and a pointer value held in the log counter 52a is below a predetermined amount. The CPUs detect it and successively start a checkpoint processing.

At a point of T5, CPU which first finished a checkpoint processing, switches from the portion of log memory 60 corresponding to log memory 6b to the portion of log memory 60 corresponding to log memory 6a and immediately returns to a normal processing. The portion of log memory 60 corresponding to log memory 6a is used for recording updated history information in the normal processing.

At a point of T6, CPU that lastly finished a checkpoint processing, performs switching from the portion of log memory 60 corresponding to log memory 6b 30 to the portion of log memory 60 corresponding to log memory 6a and the initialization of the portion of log memory 60 corresponding to log memory 6b and returns to a normal processing. Here, the initialization of the portion of log memory 60 corresponding to log memory 6b, that is, the invalidation of updated history information in the portion of log memory 60 corresponding to log memory 6b is performed by restoring the pointer value of the log counter 52b to "M−1".

In T0 through T2, a pointer value of the log counter 6a is increased, since all of CPUs records updated history in the portion of log memory 60 corresponding to log memory 6a and a pointer value of the log counter 52b remains constant as "M−1".

In T2 through T3, a pointer value of the log counter 6a is increased and a pointer value of the log counter 52b is decreased, since one of CPUs records updated history in the portion of log memory 60 corresponding to log memory 6a and the remaining CPUs records updated history in the portion of log memory 60 corresponding to log memory 6b.

At the point of T3, a pointer value of the log counter 6a becomes 0 by the initialization of the portion of log memory 60 corresponding to log memory 6a.

In T3 through T5, a pointer value of the log counter 52b is decreased and the pointer value of the log counter 52a remains constant as 0, since all of CPUs record the updated history in the portion of log memory 60 corresponding to log memory 6b.

In T5 through T6, a pointer value of the log counter 52a is increased and a pointer value of the log counter 52b is decreased, since one of CPUs records updated history in the portion of log memory 60 corresponding to log memory 6a and the remaining CPUs record updated history in the portion of log memory 60 corresponding to log memory 6b.

At the point of T6, a pointer value of the log counter 52b becomes "M−1" by the initialization of the portion of log memory 60 corresponding to log memory 6b.

As stated above, the log memories 6a and 6b of FIG. 3 is implemented by using physically the single log memory 60 in FIG. 11 by successively incrementing one of the pointer values of the two log counters from an initial address toward a last address in the log memory 60 and by successively decreasing the other thereof from the last address toward the initial address. Therefore, a hardware amount is approximately halved in comparison with the case where two of the log memories are provided.

What is claimed is:

1. A checkpoint controlling apparatus for use in a multi-processor system capable of recovering from a fault during execution of application programs, wherein the multiprocessor system has at least two processor modules, each having a processing unit and a cache memory, a shared memory for use by the processor modules to store data related to the execution of the application programs, and log memory means for recording log data as states of data in both the processor unit and the cache memory for the processor modules before updating the shared memory, and means for storing states of data in both the processor unit and the cache memory for the processor modules in the shared memory at intervals, and wherein each of the processor modules executes checkpoint processing independently, the checkpoint controlling apparatus comprising:

means for selecting one of a first portion and a second portion of the log memory means;

means for storing log data in the selected portion of the log memory means; and means for switching to the other portion of the log memory means to store log data for the first processor module after the first processor module has completed execution of checkpoint processing.

2. The checkpoint controlling apparatus of claim 1, further comprising second switching means for switching to the other portion of the log memory means to store log data after each processor module completes execution of checkpoint processing.

3. The checkpoint controlling apparatus of claim 2, further comprising:

second determination means for determining whether all of the other processor modules to execute checkpoint processing has completed the execution of the checkpoint processing; and means for clearing the selected portion of the log memory means when it is determined that all of the other processor modules to execute checkpoint processing completed the execution.

4. The checkpoint controlling apparatus of claim 1, further comprising means for changing a write policy of the cache memory of at least one of the processor modules from a "write" back cache to a "write through" cache, each of the processor modules having the write through cache memory for executing a real time process and stores only a state of data of the processor unit in the shared memory at a checkpoint processing.

5. The checkpoint controlling apparatus of claim 4, further comprising:
   means for monitoring an operational state of the multiprocessor system; and
   means for changing a number of the processor modules having a cache memory operating as a "write through" cache memory, in accordance with a throughput and a response time of the system monitored by the monitoring means.

6. The checkpoint controlling apparatus of claim 1, wherein the first portion and the second portion of the log memory means is one physical memory, the checkpoint controlling apparatus comprising:
   a first counter for holding a first pointer value indicating an address for recording log data in the first portion of the log memory means and, in which the first pointer value is successively incremented from an initial address toward a last address of the physical memory; and
   a second counter for holding a second pointer value indicating an address for recording log data in the second portion of the log memory means, in which the second pointer value is successively decremented from a last address toward an initial address of the physical memory.

7. The checkpoint controlling apparatus of claim 6, further comprising:
   means for calculating a difference between the first pointer value and the second pointer value to detect whether a remaining size the log memory means is below a predetermined amount;
   means for changing a log memory number in a log table to switch between the first and second portions of the log memory means for use after a checkpoint processing;
   means for determining whether all of the processor modules have completed checkpoint processing after each of the processor modules performs checkpoint processing; and
   means for setting the first pointer value of the first counter to the initial address if the processor module uses the first portion of the log memory means or the second pointer value of the second counter to the last address if the processor uses the second portion of the log memory means.

8. The checkpoint controlling apparatus of claim 1, wherein the selecting means includes:
   a log table for storing information showing a corresponding relationship between the processor modules and the first portion and the second portion in the log memory means used by the processor modules, in accordance with a request for switching the first portion and the second portion in the log memory means from each of the processor modules;
   means for determining one of the first portion and the second portion of the log memory means used by a processor module by referring to the log table; and
   means for selecting a pointer value of one of first and the second counters corresponding to the log memory means.

9. A method of recording log data in log memories having a shared memory shared by processor modules in a multiprocessor system, the log memories including at least first and second log memories for recording log data of the shared memory, the method comprising the steps of:
   storing a context of each of the processor modules and a content of each cache memory in the shared memory at each checkpoint processing by each of the processor modules;
   switching from the log memory that the processor module uses to the other log memory that the processor module has not used when the checkpoint processing by the processor module is finished;
   determining whether a processor module that finished a checkpoint processing is the last of the processor modules to complete checkpoint processing; and
   clearing the content of the log memory used by the processor modules if it is determined that the last processor module has completed checkpoint processing.

10. The method of claim 9, wherein the multiprocessor system includes a log table having a log memory number for determining which log memory is used by each of the processor modules, and wherein the determining step comprises the step of:
    investigating whether the processor modules, which have not changed the current log memory numbers, are present or not by reference to the log table.

11. The method of claim 9, further comprising the step of:
    changing a write policy of the cache memory of at least one of the processor modules from a "write back" cache to a write through cache, each of the processor modules having the "write through" cache memory for executing a real time process and stores only context thereof in the shared memory at a checkpoint processing.

12. The method of claim 11, further comprising the steps of:
    monitoring an operational state of the multiprocessor system; and
    changing a number of the processor modules having a cache memory operating as a "write through" cache memory, in accordance with a throughput and a response time of the system monitored by the monitoring step.

13. The method of claim 9, wherein the first and the second log memories are included in one physical memory, a first counter for holding a pointer value indicating an address for recording log data in the first log memory and, in which a pointer value is successively incremented from an initial address toward a last address of the physical memory, and a second counter for holding a pointer value indicating an address for recording log data in the second log memory, in which a pointer value is successively decremented from a last address toward an initial address of the physical memory, the method further comprising the steps of:
    calculating a difference between a pointer value in the first log counter and a pointer value in the second log counter to detect whether a remaining size the log memory is below a predetermined amount;
    changing a current log memory number in a log table to switch the log memory for use after a checkpoint processing; and determining whether a processor module that finished the checkpoint processing is the last processor module of the processor modules to complete the checkpoint processing; and setting a pointer value of the first counter to the initial address if the processor module uses the first log memory or a pointer value of the second counter to the last address if the processor module uses the second log memory.

14. A checkpoint controlling method for use in a fault tolerant multiprocessor system capable of recovering from a fault during execution of application programs, wherein the fault tolerant multiprocessor system has a plurality of log memories, at least two processor modules each having a processor unit and a cache memory, a shared memory, and means for storing data in the shared memory at intervals, and wherein each of the processor modules executes checkpoint processing independently, the checkpoint controlling method comprising the steps of:

selecting one of a first log memory and a second log memory of the plurality of log memories of the fault tolerant multiprocessor system;

storing log data in the selected one of the first and the second log memories, the log data including a context of the processing unit and a content of the cache memory for the processor modules executing checkpoint processing;

determining whether all of the processor modules have completed execution of checkpoint processing; and clearing the selected one of the first and the second log memories when it is determined that all of the processor modules have completed execution of checkpoint processing.

15. The method of claim 14 further comprising the steps of:

determining whether a first one of the processor modules has completed checkpoint processing; and selecting one of the log memories that is different from the one of the log memories previously selected to store log data for the first processor module, when it has been determined that the first module has completed checkpoint processing.

16. The method of claim 15 wherein the fault tolerant multiprocessor system includes a log table for maintaining a list identifying which of the plurality of log memories is used to store log data for each of the plurality of processor modules, and wherein the selecting step comprises the substep of:

updating the log table to indicate that a different one of the log memories has been selected to store log data for the first processor module.

17. The method of claim 16 wherein a single physical memory includes a plurality of portions, each of said portions corresponding to one of the plurality of log memories, and the multiprocessor system includes a first counter for holding a first pointer value indicating an address for recording log data in the first log memory, the first pointer value being incremented from an initial address to a last address of the physical memory, and a second counter for holding a second pointer value indicating an address for recording log data in the second log memory, the second pointer value being decremented from the last address to the initial address of the physical memory, the method further comprising the steps of:

calculating a difference between the first pointer value and the second pointer value to detect whether a remaining size the log memory is below a predetermined amount;

changing a current log memory number of a log table to switch the log memory for use after a checkpoint processing;

determining whether a processor module that finished the checkpoint processing is last processor module of the processor modules to complete the checkpoint processing; and setting the first pointer value to the initial address if the processor module uses the first log memory or to the second pointer value if the processor module uses the second log memory.

18. A checkpoint controlling method for use in a fault tolerant multiprocessor system capable of recovering from a fault during execution of application programs, wherein the fault tolerant multiprocessor system has a plurality of log memories, at least two processor modules each having a processor unit and a cache memory, a shared memory, and means for storing data in the shared memory at intervals, and wherein each of the processor modules repeatedly executes a checkpoint processing independently, the checkpoint controlling method comprising the steps of;

selecting one of a first log memory and a second log memory of the plurality of log memories of the fault tolerant multiprocessor system;

storing log data in the selected one of the first and the second log memories, the log data including a context of the processing unit and a content of the cache memory for the processor modules executing checkpoint processing;

determining whether all of the processor modules have completed execution of checkpoint processing; and clearing the selected one of the first and the second log memories when it is determined that all of the processor modules have completed an iteration of the checkpoint processing.

19. A checkpoint controlling method for use in a fault tolerant multiprocessor system capable of recovering from a fault during execution of application programs, wherein the fault tolerant multiprocessor system has a plurality of log memories, at least two processor modules each having a processor unit and a cache memory, a shared memory, and means for storing data in the shared memory at intervals, and wherein each of the processor modules executes checkpoint processing independently, the checkpoint controlling method comprising the steps of:

(a) selecting a first log memory of the plurality of log memories of the fault tolerant multiprocessor system;

(b) determining whether a first one of the processor modules, has completed execution of checkpoint processing;

(c) storing log data for the first processor module in the selected first log memory, the log data including a context of the processing unit and a content of the cache memory for the first processor module at a time prior to execution of the checkpoint processing;

(d) switching to a second log memory different than the first log memory, selected during step (a);

(e) determining whether a second one of the processor modules has completed execution of checkpoint processing; and (f) storing log data for the second processor module in the first log memory, the log data including a context of the processing unit and a content of the cache memory for the second processor module at a time prior to execution of the checkpoint processing.

20. A checkpoint controlling system for use in a fault tolerant multiprocessor system capable of recovering from a fault during execution of application programs, wherein the fault tolerant multiprocessor system has a plurality of log memories, at least two processor modules each having a processor unit and a cache memory, a shared memory, and means for storing data in the shared memory at intervals, and wherein each of the processor modules executes checkpoint processing independently, the checkpoint controlling system comprising:

- means for selecting one of a first log memory and a second log memory of the plurality of log memories of the fault tolerant multiprocessor system;
- means for storing log data in the selected one of the first and the second log memories, the log data including a context of the processing unit and a content of the cache memory for the processor modules executing checkpoint processing;
- means for determining whether all of the processor modules have completed execution of checkpoint processing; and
- means for clearing the selected one of the first and the second log memories when it is determined that all of the processor modules have completed execution of checkpoint processing.

21. A fault tolerant multiprocessor system capable of recovering from a fault during execution of application programs, comprising:

- a plurality of log memories;
- at least two processor modules, each having a processor unit and a cache memory, wherein each of the processor modules executes checkpoint processing independently;
- a shared memory;
- means for storing data in the shared memory at intervals;
- means for selecting one of a first log memory and a second log memory of the plurality of log memories;
- means for storing log data in the selected one of the first and the second log memories, the log data including a context of the processing unit and a content of the cache memory for the processor modules executing checkpoint processing;
- means for determining whether all of the processor modules have completed execution of checkpoint processing; and
- means for clearing the selected one of the first and the second log memories when it is determined that all of the processor modules have completed execution of checkpoint processing.

\* \* \* \* \*